QUANTITATIVE ANALYSIS OF WAX COMPOSITIONS

PERCENTAGES OF OPTIMUM WAX COMPOSITIONS

United States Patent Office 3,826,735
Patented July 30, 1974

3,826,735
WAX COMPOSITION FOR PROTECTING RUBBERS AGAINST ATTACK OF OZONE
Toshihiko Shinomura, Kawasaki, Japan, assignor to Nippon Oil Company, Tokyo, Japan
Filed Mar. 7, 1973, Ser. No. 338,674
Claims priority, application Japan, Mar. 8, 1972, 47/23,105
Int. Cl. C08h 9/00
U.S. Cl. 208—21                                          3 Claims

ABSTRACT OF THE DISCLOSURE

Wax compositions are disclosed which are useful for preventing rubber from becoming degraded or otherwise damaged in contact with ozone in the atmosphere, said compositions comprising two types of normal chain hydrocarbons, one having a carbon number greater than the other. Selected weight percentages of the respective hydrocarbons permit the wax composition to exhibit and maintain the desired performance in a relatively widely varying temperature environment.

---

This invention relates to improvements in and relating to the protection of rubber and similar products against deterioration in contact with ozone. More particularly, the invention is directed to the provision of certain wax compositions which can protect rubbery articles against the attack of ozone in a relatively widely varying temperature environment.

Figure 2:
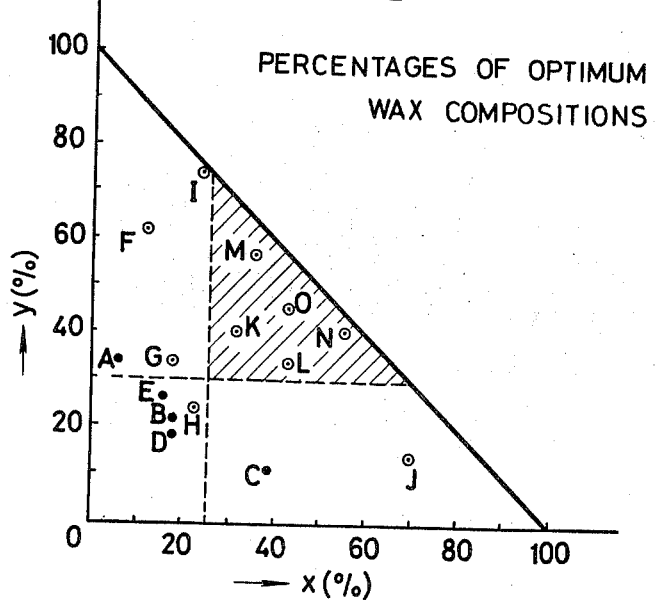

The wax compositions according to the invention contain a selected weight percentage ($x$) of normal chain hydrocarbons having a carbon number of 26 to 29 and a selected weight percentage ($y$) of normal chain hydrocarbons having a carbon number of 34 to 40, the said percentages being represented by a point within the closed triangular area KLMNO of FIG. 2.

Heretofore, it has been known that strained rubbers are susceptible to rupture upon contact with ozone in the air.

Various methods have been proposed for preventing rubber from becoming deteriorated by the influence of ozone. One method is to add certain aromatic diamine derivatives such as antioxidant. Another typical method is to use petroleum wax. In accordance with the former method, the antioxidant incorporated in the rubber chemically reacts with ozone in such a manner that attack of the rubber by ozone is prevented. In accordance with the latter method, the wax tends to diffuse and bloom on the surface of the rubber with a lapse of time forming a film phase which functions physically to protect the rubber. While it is possible to use these two methods at the same time, the method of using waxes is preferred in that the wax is less costly and does not contribute to objectionable colors in the rubber.

Heretofore, there have been employed for the purposes mentioned petroleum paraffin wax and petroleum microcrystalline wax having a melting point of the order of 63° to 83° C. according to the Japanese Industrial Standards (JIS K 2521). These waxes are not satisfactory for the purpose of eliminating the influence of ozone upon rubber. There are known no such effective wax compositions which can maintain rubbers immune to deterioration by ozone throughout the seasons.

The primary object of this invention is to provide wax compositions having a peculiar performance of preventing rubber from ozone deterioration over a wide temperature range.

It has now been discovered that the wax compositions available in accordance with the invention and defined in the appended claims can exhibit surprisingly high ability of preventing rubber and similar materials from ozone deterioration in a widely varying temperature environment.

The discovery results from a zealous study of the mechanism of wax performance which has indicated that most of the presently available ozone deterioration preventing waxes have compositions appreciably deviating from the optimum properties which are required and which are now achieved by the invention.

It was surprising to find that when a wax is blended with rubber and the blend is vulcanized and left as it is at room temperature, the wax tends to bloom on the surface of the rubber sheet and form a wax phase which protects the rubber sheet from the attack of ozone. The wax becomes fractionated while it is diffused in the rubber and separated onto the surface of the sheet. In other words, wax components having a determinate carbon number tend to bloom over the surface of the rubber regardless of whatever starting wax compositions.

The mechanism of the above-mentioned fractionation or separation phenomenon is believed to take place wherein a relatively low carbon number wax component does not bloom onto the rubber surface because it is molecularly compatible with rubber, and on the other hand, a relatively high carbon number wax component due to slow diffusing speed becomes isolated inside rubber and does not become separated onto the rubber surface. A study of this phenomenon further indicates that only a selected carbon number in a given wax composition is a critical factor to the success of the invention as later more fully described.

Furthermore, it has been also found that a branched chain hydrocarbon component of the wax is not effective for preventing the ozone deterioration.

In view of the above facts, the present inventors have found that normal chain hydrocarbons having a certain number of carbon atoms are highly effective for preventing the ozone deterioration in a temperature environment (40°–60° C.) specified by JIS K 6301-1966 as disclosed in a copending application of the present inventors U.S. Ser. No. 212,635, filed Dec. 27, 1971.

It is of course possible to apply one particular category of wax compositions depending upon a particular temperature environment and another depending upon another particular temperature environment. However, it is far more advantageous to use one and the same type of wax composition for rubber which can maintain the required ability of preventing the rubber from ozone deterioration throughout all seasons and during storage of the rubber products both in winter and summer or during transportation from one place to another or under any temperature varying conditions. Needless to mention, the use of a large quantity of wax is economically undesirable and at the same time may adversely affect the modulus, hardness, permanent strain and other properties of rubber. According to the invention, there is provided for the first time such a wax composition which can exhibit the desired performance with a very limited quantity.

The wax compositions according to the invention are characterized by the weight percentages of a first normal chain hydrocarbon having a carbon number of 26 to 29 and a second normal chain hydrocarbon having a carbon number of 34 to 40, the first hydrocarbon being plotted against the second hydrocarbon and the effective weight percentages ($x$) and ($y$) of the respective hrydrocarbons being represented by a point within the closed triangular area of FIG. 2 wherein the ($x$) value is from 25 to 70 and the ($y$) value from 30 to 70.

Figure 1:
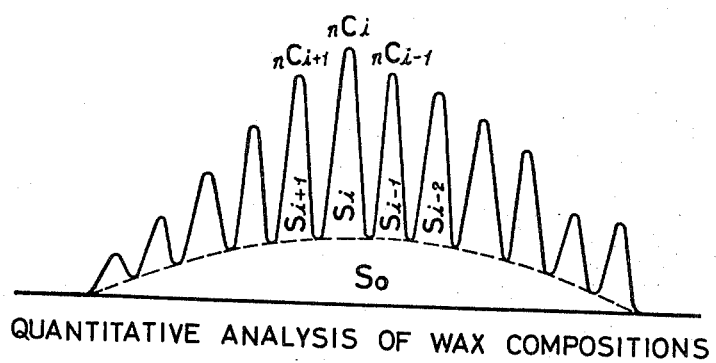

The contents of each composition have been quantitatively determined with use of a column 3 mm. in diameter and 1 mm. in length of a carrier of Chromosorb G (60–80 mesh) and a liquid phase of silicone SE, 3% at a temperature elevating speed of 40° C./min., this calculation being made on the basis of the chart of FIG. 1. Chromosorb G is a support material marketed by John Manville made from diatomaceous silica. Silicone SE-52, 3% is a silicone rubber gum marketed by General Electric.

The compositions according to the invention may be obtained by a variety of processes. They may be obtained by distillation of known petroleum or synthetic waxes, or by blending a wax rich in normal chain hydrocarbons having a carbon number of 26 to 29 with another wax rich in normal chain hydrocarbons having a carbon number of 34 to 40.

Petroleum wax may be obtained usually by the process in which crude oil is distilled under the ordinary pressure, yielding a tower bottom oil, which is further distilled under reduced pressure, yielding a fraction, from which aromatic components are removed by solvent extraction using phenol, furfural, or the like. The residue is, preferably after being hydrofinished, further solvent-dewaxed with ketone, an aromatic mixed solvent, or the like, yielding dewaxed oil for use as lubricants. As a by-product from the dewaxing step, crude wax is obtained. The crude wax is further deoiled by solvent, removing a low fraction therefrom and yielding deoiled wax. Alternatively, the crude wax may be deoiled by a sweating process, yielding deoiled wax. The deoiled wax may be further purified by treating it with sulphuric acid, clay, or the like.

Although the desired wax composition in accordance with this invention may be obtained by distilling deoiled wax obtained by the usual processes as above, it is preferred that a narrow cut distillation be carried out so that there are obtained a first fraction consisting predominantly of hydrocarbons having from 26 to 29 carbon atoms and a second fraction consisting predominantly of hydrocarbons having from 34 to 40 carbon atoms. These two fractions may be blended.

Furthermore, there may be used polyolefins obtained by the polymerization of olefins such as ethylene and the like, thermal cracking products of polyolefins, waxes synthesized by the Fischer-Tropsch process, and compositions obtained from the polyolefins, thermal cracking products, and synthesized waxes, as above, by subjecting them to distillation or extraction so that the compositions have the required number of carbon atoms.

The invention will now be more fully described by way of the following examples.

EXAMPLE 1

The various waxes listed in Table 1 were each blended with SBR 1712 together with vulcanizing agents in accordance with the following recipe:

Blending Recipe

| | |
|---|---|
| Rubber | 100 |
| Zinc white | 5 |
| Stearic acid | 1 |
| High abrasion furnace black | 40 |
| Vulcanization accelerator CZ | 1 |
| Sulphur | 2 |
| Wax | 2 |

NOTE.—The term "CZ" is an abbreviation for N-cyclohexyl-2-benzothiazyl sulfenamide which is a well known vulcanization accelerator.

Each blend was vulcanized at 150° C. for 30 minutes in the usual manner, thereby producing a sheet of rubber. The various sample rubber sheets thus prepared according to the invention were elongated and set as regards the respective static strains and thereafter subjected to ozone deterioration tests to determine the performance of the various prototype wax samples as well as of conventional wax samples. The various wax compositions are graphically indicated in FIG. 2, from which it is to be noted that the compositions K, L, M, N and O defined within the closed triangular area of the graph are capable of preventing rubber from ozone deterioration consistently over varying temperature ranges as shown in Table 1. The tests indicate that the conventional wax compositions are all unsatisfactory in their rubber protection ability with regard to temperature. For example, samples F and I amongst the prototype wax samples were satisfactory at 50° C. but not so at lower temperatures. Conversely, sample J was found better at lower temperature conditions but less satisfactory at 50° C.

TABLE 1.—WAX COMPOSITIONS AND THEIR PERFORMANCE

| | Percent | | | | | | | | |
|---|---|---|---|---|---|---|---|---|---|
| | Composition of wax | | | | | | Performance (critical strain)[1] | | |
| Wax samples | Branched | $nC_{25}$ or less | $nC_{25}$ to $nC_{29}$ | $nC_{30}$ to $nC_{33}$ | $nC_{34}$ to $nC_{40}$ | $nC_{41}$ or more | 10° C. | 30° C. | 50° C. |
| Conventional: | | | | | | | | | |
| A | 35.6 | 0 | 5.8 | 22.0 | 32.2 | 4.4 | 10 | 20 | 15 |
| B | 23.0 | 1.3 | 18.9 | 28.3 | 22.3 | 6.2 | 20 | 20 | 10 |
| C | 9.8 | 2.7 | 39.1 | 36.5 | 11.9 | 0 | 30 | 30 | 10 |
| D | 0 | 0 | 18.9 | 64.4 | 16.7 | 0 | 20 | 30 | 10 |
| E | 26.3 | 8.6 | 16.9 | 18.2 | 26.6 | 3.1 | 20 | 20 | 10 |
| Prototype: | | | | | | | | | |
| F | 12.3 | 2.7 | 11.5 | 8.4 | 63.0 | 2.1 | 20 | 20 | 40 |
| G | 22.0 | 3.8 | 19.2 | 17.6 | 34.0 | 3.4 | 20 | 20 | 20 |
| H | 26.4 | 10.0 | 21.4 | 14.5 | 23.5 | 4.2 | 20 | 20 | 10 |
| I [2] | 0 | 1.2 | 22.0 | 1.3 | 74.5 | 1.0 | 20 | 20 | 50 |
| J [2] | 0 | 5.6 | 71.3 | 6.4 | 13.5 | 3.2 | 50 | 50 | 10 |
| K | 12.7 | 6.0 | 30.4 | 11.2 | 38.2 | 1.5 | 30 | 30 | 30 |
| L | 11.4 | 2.9 | 42.6 | 9.6 | 33.5 | 0 | 30 | 40 | 25 |
| M | 3.4 | 0 | 37.5 | 4.2 | 54.2 | 0.7 | 30 | 40 | 50 |
| N [2] | 0 | 0 | 57.8 | 3.2 | 37.2 | 1.8 | 40 | 50 | 30 |
| O | 0 | 3.0 | 42.7 | 7.6 | 44.5 | 2.2 | 30 | 40 | 40 |

[1] The ozone deterioration preventing performance is determined by the state of cracks formed in the sample rubber sheet which has been elongated and set with respect to various static strain values and exposed in an atmosphere having an ozone concentration of 50 p.p.h.m. at a temperature of 50° C. for a duration of 5 hours (in conformity with the JIS K 6301 of 1960). The minimum static strain resulting therefrom was taken as a critical strain causing cracks in the rubber sheet during the course of the above ozone deterioration test. It follows that the greater the critical strain, the better the ozone deterioration preventing performance.

[2] This prototype sample was prepared from a wax (low molecular weight polyethylene) resulting from the polymerization of ethylene and fractionated and blended.

EXAMPLE 2

The procedure of Example 1 was followed in preparing vulcanized rubber sheets with use of prototype wax samples K, M and N in particular. The ozone deterioration test indicated that these wax compositions exhibit remarkable performance of preventing rubber from becoming deteriorated in contact with ozone at different temperatures as seen in Table 2.

TABLE 2.—OZONE DETERIORATION PREVENTING PERFORMANCE OF INVENTIVE WAX COMPOSITIONS

| Wax sample | Rubber | Performance (critical strain) | | |
|---|---|---|---|---|
| | | 10° C. | 30° C. | 50° C. |
| | | Percent | | |
| Prototype: | | | | |
| K | Solution polymerization polybutadiene rubber, oil extended (JSR BR 31). | 40 | 30 | 30 |
| | Emulsion polymerization styrene-butadiene rubber (JSR 1500). | 30 | 30 | 30 |
| | Solution polymerization styrene-butadiene rubber, oil extended (Tufdene 1530). | 30 | 30 | 30 |
| M | JSR BR 31 | 40 | 40 | 50 |
| | JSR 1500 | 30 | 40 | 50 |
| | Tufdene 1530 | 30 | 40 | 50 |
| N | JSR BR 31 | 50 | 50 | 30 |
| | JSR 1500 | 40 | 50 | 30 |
| | Tufdene 1530 | 40 | 50 | 30 |

In the accompanying drawings:

FIG. 1 graphically illustrates the quantitative determination of the various wax compositions in which a chart obtained by the temperature-elevating gas chromatographic method is compared with the peaks of various n-paraffins thereby determining the carbon number of each peak. The wax composition is computed from the base area $So$ and each peak area ($Si$, $Si+1$, $Si+2$ and so on) in accordance with the formulae given below.

(1)
$$\text{Branched n-}C_n \text{ weight percent} = \frac{So}{So + \Sigma i Si} \times 100$$

(2)
$$\text{n-Paraffin weight percent } nCi = \frac{Si}{So + \Sigma i Si} \times 100$$

FIG. 2 is a graph illustrating the ozone deterioration preventing performance of the various wax compositions where the axis ($x$) represents the weight percentages of $nC_{26}$ to $nC_{29}$, the axis ($y$) represents the weight percentages of $nC_{34}$ to $nC_{40}$, the solid dot indicates the conventional wax compositions and the dot in circle indicates the prototype wax compositions prepared and used in the above Example 1.

What is claimed is:

1. A wax composition for preventing rubber from ozone deterioration which comprises a first normal chain hydrocarbon having a carbon number of 26 to 29 and a second normal chain hydrocarbon having a carbon number of 34 to 40, characterized in that the weight percentages of said first and second hydrocarbons are defined by a point within the closed triangular area of FIG. 2.

2. A wax composition as claimed in claim 1 which is obtained by distillation of petroleum or synthetic waxes.

3. A wax composition as claimed in claim 1 which is obtained by blending a normal chain hydrocarbon having a carbon number of 26 to 29 with a normal chain hydrocarbon having a carbon number of 34 to 40.

References Cited
UNITED STATES PATENTS 2,467,959   4/1949   Bowman et al. _____ 208—21
2,915,447   12/1959  Arabian _____ 208—21
3,069,346   12/1962  Tench _____ 208—21

HERBERT LEVINE, Primary Examiner

U.S. Cl. X.R.

106—270; 260—28.5 A, 28.5 B, 757